US008818623B2

(12) United States Patent
Han

(10) Patent No.: US 8,818,623 B2
(45) Date of Patent: Aug. 26, 2014

(54) METHOD AND SYSTEM FOR PROVIDING IMAGE INFORMATION

(75) Inventor: Kyeong-Soo Han, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 497 days.

(21) Appl. No.: 12/839,966

(22) Filed: Jul. 20, 2010

(65) Prior Publication Data

US 2011/0153155 A1 Jun. 23, 2011

(30) Foreign Application Priority Data

Dec. 21, 2009 (KR) ........................ 10-2009-0128440

(51) Int. Cl.
*G08G 1/00* (2006.01)
*G06F 19/00* (2011.01)
*G08G 1/0962* (2006.01)

(52) U.S. Cl.
CPC .......... *G08G 1/0962* (2013.01); *G08G 1/09623* (2013.01)
USPC ............................................. 701/36; 701/421

(58) Field of Classification Search
None
See application file for complete search history.

(56) References Cited

U.S. PATENT DOCUMENTS

| | | | | |
|---|---|---|---|---|
| 2007/0118281 | A1 * | 5/2007 | Adam et al. | 701/211 |
| 2008/0055056 | A1 | 3/2008 | Mase et al. | |
| 2009/0112452 | A1 * | 4/2009 | Buck et al. | 701/117 |

FOREIGN PATENT DOCUMENTS

| | | |
|---|---|---|
| JP | 2004-272507 | 9/2004 |
| JP | 2008-059082 | 3/2008 |
| JP | 2009-110153 | 5/2009 |
| KR | 10-2004-0022742 | 3/2004 |
| KR | 1020040103277 | 12/2004 |
| KR | 1020090018192 | 2/2009 |
| KR | 10-0915228 | 8/2009 |

* cited by examiner

*Primary Examiner* — Paul Danneman
(74) *Attorney, Agent, or Firm* — Nelson Mullins Riley & Scarborough LLP

(57) ABSTRACT

A system for providing image information while interworking with a plurality of photographing apparatuses converts each of at least one image transmitted from the plurality of photographing apparatuses into a frame, and inserts the coordinates of the intersection into the converted frame. Next, the system determines whether a vehicle enters the intersection based on the frame into which the coordinates of the intersection are inserted, the current travelling direction of the vehicle, and the current position coordinates of the vehicle. The system extracts image information of the road intersecting at the frame corresponding to each of at least one image, when the vehicle enters the vehicle, and provides the extracted image information to the user through a terminal in the vehicle.

12 Claims, 4 Drawing Sheets

METHOD AND SYSTEM FOR PROVIDING IMAGE INFORMATION

CROSS-REFERENCE TO RELATED APPLICATION

This application claims priority to and the benefit of Korean Patent Application No. 10-2009-0128440 filed in the Korean Intellectual Property Office on Dec. 21, 2009, the entire contents of which are incorporated herein by reference.

BACKGROUND OF THE INVENTION (a) Field of the Invention

The present invention relates to a method and system for providing image information. In particular, the present invention relates to a method and a system for providing image information in each direction to a vehicle that approaches an intersection.

(b) Description of the Related Art

An intelligent transportation system (hereinafter referred to an "ITS") is a system that provides traffic information to a user. Herein, the traffic information includes information such as from traffic lights received from a traffic signal controller that is installed at an intersection or a crosswalk.

An ITS in the related art uses a terminal in a vehicle to provide traffic information limited to the traffic light information to a user (driver). In addition, a method for providing the traffic information to the user is nothing but flickering of an LED included in a terminal in a vehicle, a simple text display on the LCD, or a voice guide using a text display or text-to-speech (TTS).

The traffic information can help a driver of the vehicle safely drive the vehicle. However, a driver of a vehicle entering an intersection requires more detailed traffic information.

For example, when the vehicle approaches the intersection, a situation in a straight direction can be directly confirmed with the driver's eyes in the vehicle, but the intersected road situation can be confirmed only in the case where the driver reaches the intersection due to buildings, etc., that hinder the view of a driver.

Therefore, even when the vehicle goes straight, it is necessary to confirm the detailed traffic information on the situation of the vehicles, etc., approaching on the left and right roads. In addition, even when the vehicle makes a left turn or a right turn, it is necessary to confirm whether there is a pedestrian or a parking or stopping vehicle on a road in a rotating direction of the vehicle, there is a vehicle approaching at left and right roads, or there is a drive hindrance or a risk factors for safe driving on the road.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide image information in each direction of intersections to a vehicle entering the intersections.

An exemplary embodiment of the present invention provides a method for providing image information to a user in a vehicle by a system that is operated while interworking with a plurality of photographing apparatuses, including:

converting each of at least one image transmitted from the plurality of photographing apparatuses into a frame by the system; inserting coordinates of an intersection into the frame; determining whether the vehicle enters the intersection based on the frame into which the coordinates of the intersection are inserted and the current travelling direction of the vehicle and the current position coordinates of the vehicle; when the vehicle enters the intersection, extracting image information of an intersected road from the frame corresponding to each of the at least one image; and providing the extracted image information to the user through a terminal in the vehicle.

Another exemplary embodiment of the present invention provides a system for providing image information that is operated while interworking a plurality of photographing apparatuses that photograph a road situation, including:

an image processor that converts at least one image transmitted from the plurality of photographing apparatuses into a frame and inserts coordinates of an intersections into the frame; an enter determination unit that determines whether the vehicle enters the intersection based on the frame including the coordinates of the intersection, the current travelling direction of the vehicle, and the current position coordinates of the vehicle; and an extractor that extracts image information of an intersected road from the frame corresponding to each of the at least one image, when the vehicle enters the intersection.

DETAILED DESCRIPTION OF THE EMBODIMENTS

Figure 1:
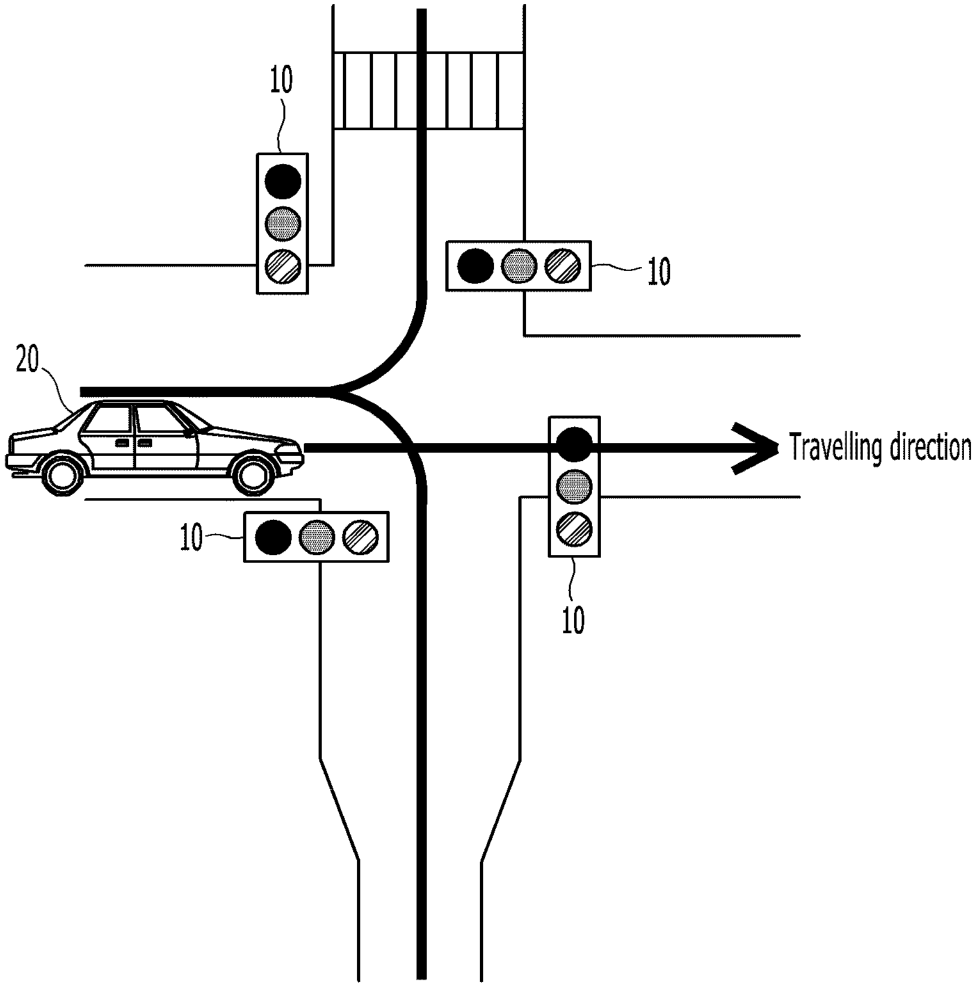
FIG. 1 is a diagram showing an environment where image information according to an exemplary embodiment of the present invention is provided to a driver.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the specification, unless explicitly described to the contrary, the word "comprise" and variations such as "comprises" or "comprising" will be understood to imply the inclusion of stated elements but not the exclusion of any other elements.

Hereinafter, a system and a method for providing image information according to an exemplary embodiment of the present invention will be described in detail with reference to the accompanying drawings.

Figure 2:
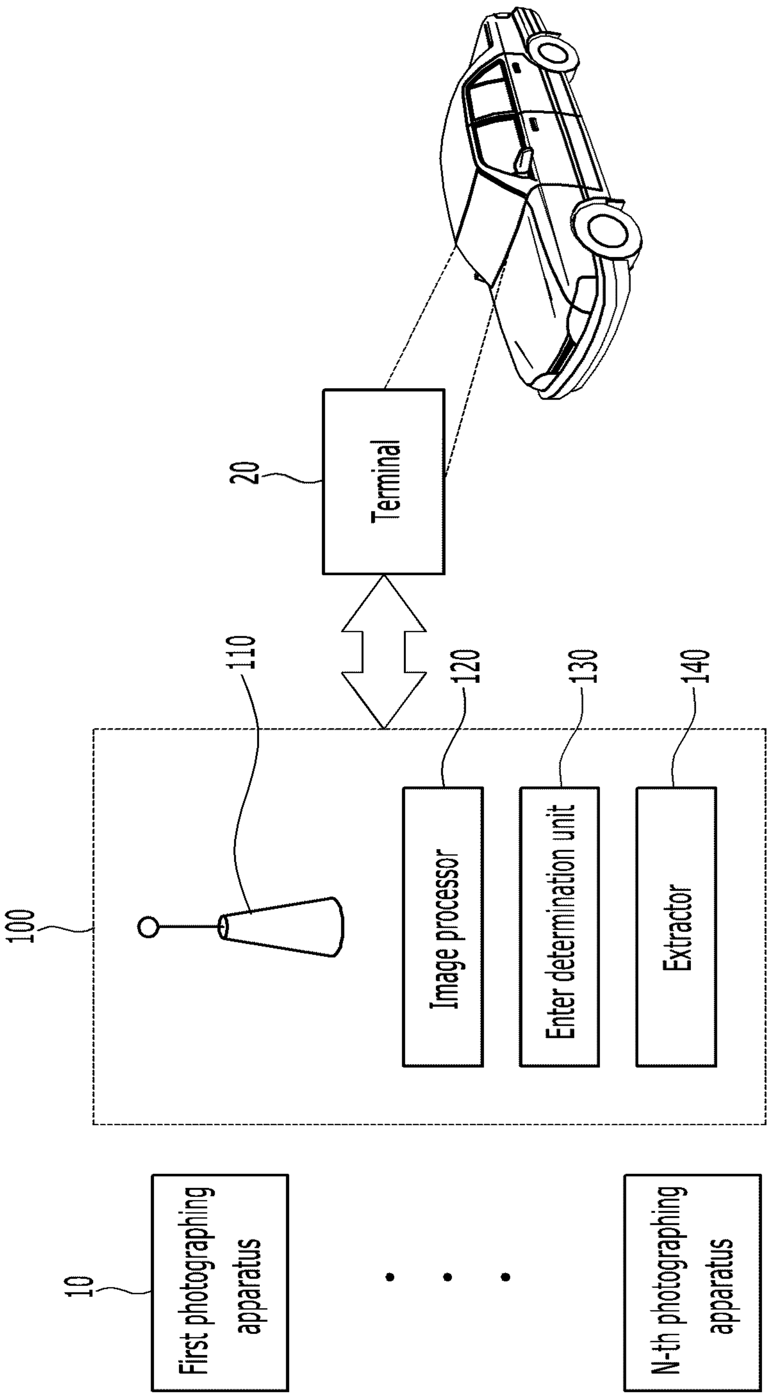
FIG. 2 is a diagram schematically showing a system for providing image information according to an exemplary embodiment of the present invention.

FIG. 1 is a diagram showing an environment where image information according to an exemplary embodiment of the present invention is provided to a driver, and FIG. 2 is a diagram schematically showing a system for providing image information according to an exemplary embodiment of the present invention.

Referring to FIG. 1, a system for providing image information according to an exemplary embodiment of the present invention is operated while interworking with a plurality of photographing apparatuses 10 (first to N-th photographing apparatuses) that collect image information on a road.

Each of the plurality of photographing apparatuses 10 photographs the road situation in the installed direction.

The system for providing image information according to an exemplary embodiment of the present invention provides the image information of a point where roads intersect with each other (hereinafter referred to as "intersection") to a terminal 20 in a vehicle approaching the intersection. Herein, the image information includes images corresponding to each road at the intersection. The system for providing image information can be applied to the terminal 20 in the vehicle, but is not limited thereto.

The terminal 20 uses a global positioning system (hereinafter referred to as "GPS") receiver (not shown) to extract the current direction and current position coordinates of the vehicle and receives the image information of the corresponding intersection. Therefore, the terminal 20 in the vehicle provides the image information on the intersection transmitted from a system 100 for providing image information to a user. Herein, the terminal 20 may be a terminal that is owned by a user of the corresponding vehicle or a terminal that is attached to the vehicle.

Referring to FIG. 2, the system for providing image information 100 includes a communication unit 110, an image processor 120, an enter determination unit 130, and an extractor 140.

The communication unit 110 receives at least one image from the plurality of photographing apparatuses 10.

The communication unit 110 according to the exemplary embodiment of the present invention may be a base station (not shown) that is installed at the intersections, but is not limited thereto. At this time, the communication unit 110 broadcasts image information to a terminal 20 in a vehicle that enters its own communication radius.

The image processor 120 converts at least one image transmitted through the communication unit 110 into a frame including the corresponding road direction information of an image. At this time, the road direction information is the travel direction of the vehicles at an image of the corresponding road photographed by the photographing apparatus. Next, the image processor 120 inserts the coordinates of the intersections into the converted frame and transmits it to the enter determination unit 130.

The enter determination unit 130 uses the coordinates of the intersections included in the frame, the current travelling direction of the vehicle, and the current position coordinates of the vehicle to determine whether the vehicle enters or is out of the intersection. Herein, the enter determination unit 130 receives the current travelling direction of the vehicle and the current position coordinates of the vehicle from the GPS receiver (not shown) of the terminal 20.

In detail, the enter determination unit 130 determines that the vehicle enters the intersection when the current position coordinate of the vehicle is included in the setting radius based on the coordinates of the intersection and the travel direction of the vehicle faces the coordinates of the intersection. On the other hand, the enter determination unit 130 determines that the vehicle is out of the intersection when the current position coordinate of the vehicle is included in the predetermined radius based on the coordinates of the intersection but the travel direction of the vehicle does not face the coordinate of the intersections. In addition, the enter determination unit 130 determines that the vehicle is out of the intersection even when the current position coordinates of the vehicle are not included in the predetermined radius based on the coordinates of the intersection.

When the vehicle is out of the intersection, the enter determination unit 130 discards the received frame.

When the vehicle enters the intersection, the extractor 140 compares the corresponding road direction information of the image included in the frame with the travel direction the vehicle, thereby extracting the image information of the intersected roads. At this time, the extractor 140 displays whether the corresponding road of the image is travelling to any direction on the extracted image information.

Next, the communication unit 110 broadcasts the extracted image information to the terminal 20 of the vehicle. In other words, the user in the vehicle can receive the image information through the screen of the terminal 20. Thereby, the user can view the situation of the intersected roads through the image before reaching the intersection and can cope with the situation of the road.

Next, a method for providing image information will be described in detail with reference to FIGS. 3 to 4.

Figure 3:
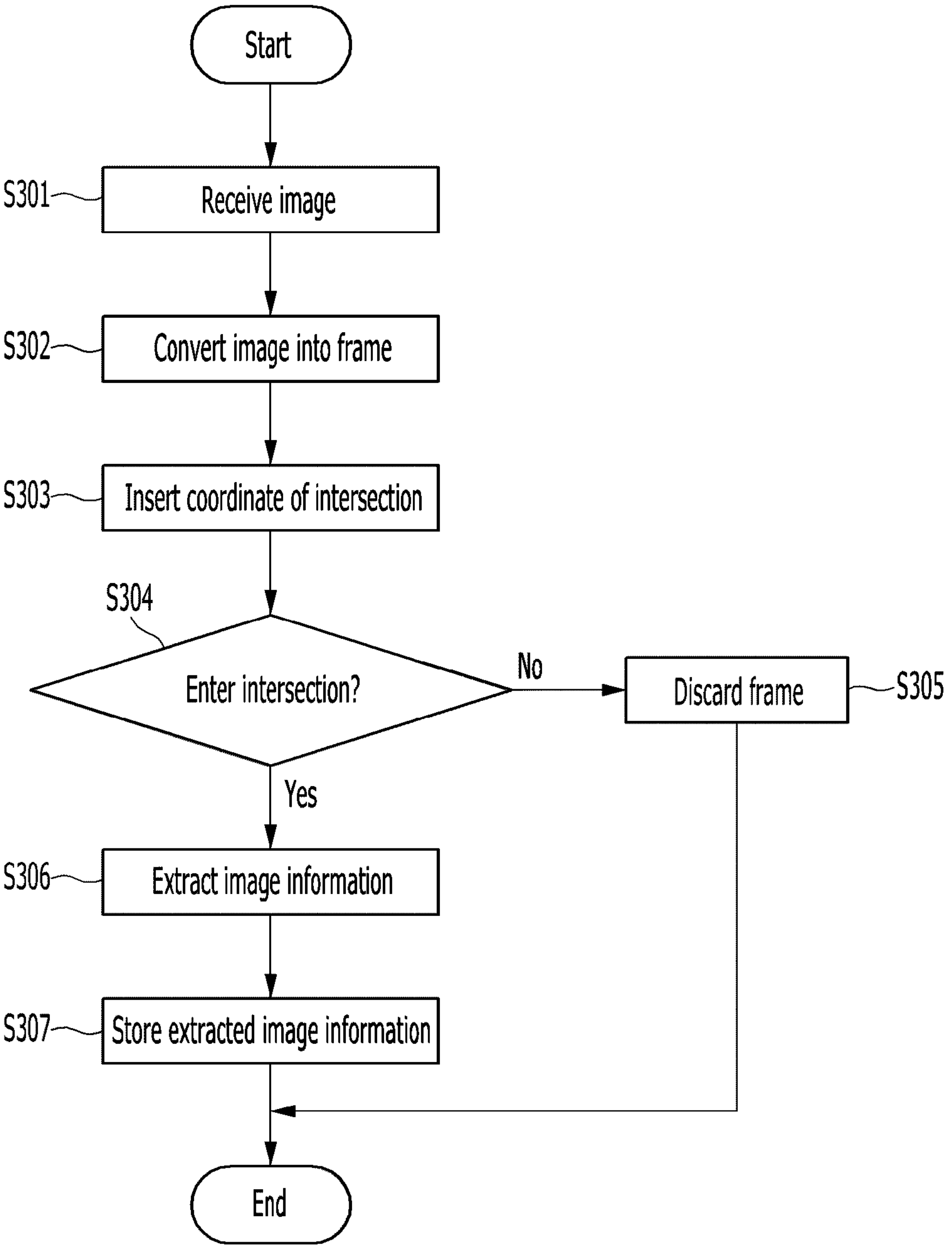
FIG. 3 is a flowchart showing a method for providing image information according to an exemplary embodiment of the present invention.
Figure 4:
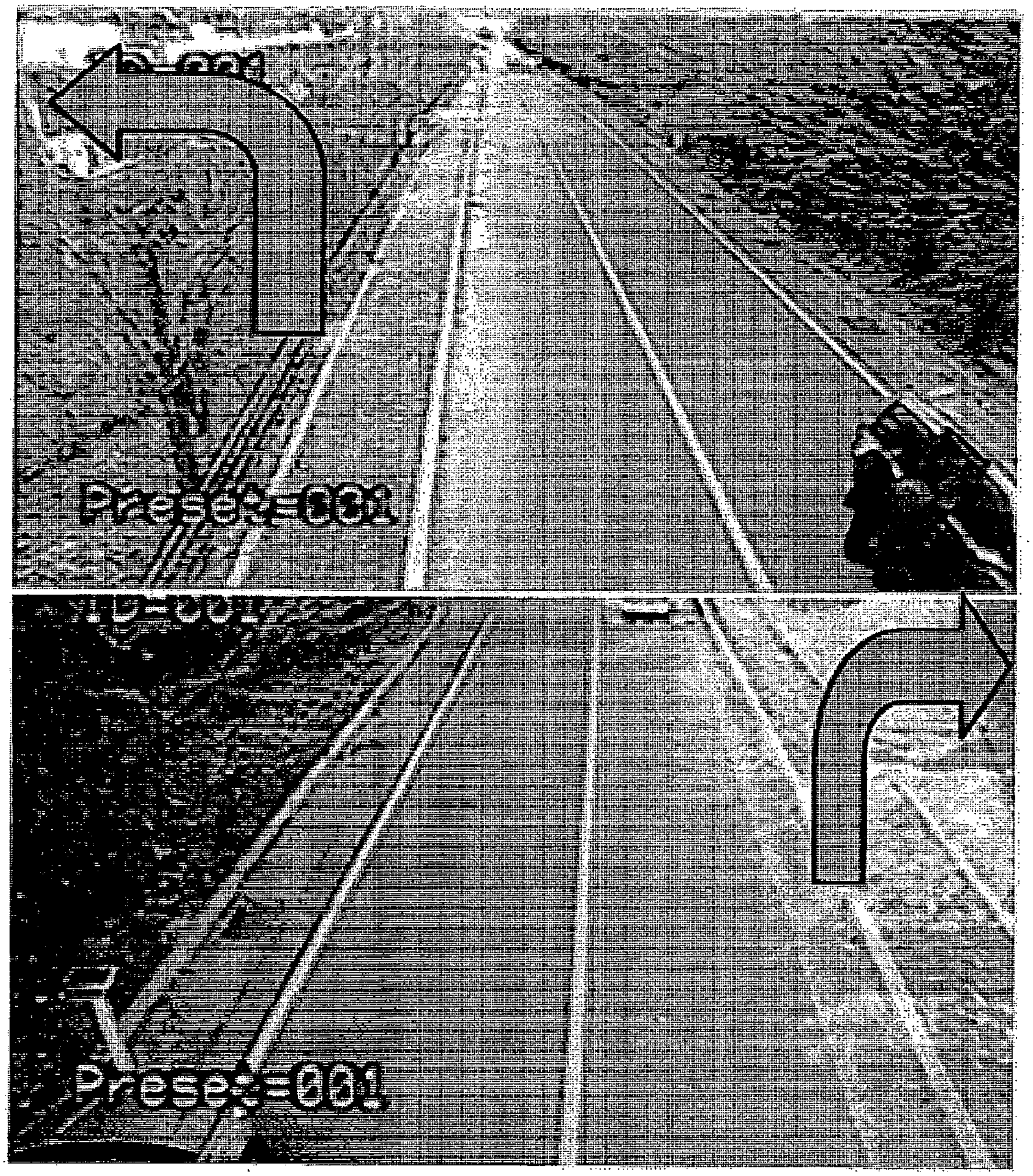
FIG. 4 is a diagram showing the image information provided to the user by the terminal in the vehicle according to an exemplary embodiment of the present invention.

FIG. 3 is a flowchart showing a method for providing image information according to an exemplary embodiment of the present invention, and FIG. 4 is a diagram showing the image information provided to the user by the terminal in the vehicle according to an exemplary embodiment of the present invention.

First, the system for providing image information 100 according to an exemplary embodiment of the present invention is operated while interworking with the plurality of photographing apparatuses 10 (first to N-th photographing apparatuses) that collect the image information on the road. Each of the plurality of photographing apparatuses 10 photographs the situation of the road in the installed direction.

Referring to FIG. 3, the system for providing image information 100 receives at least one image from the plurality of photographing apparatuses 10 (S301).

The system for providing image information 100 converts at least one received image into the frame including the corresponding road direction information of the image (S302). At this time, the road direction information is a travelling direction of the vehicles on the road.

Next, the system for providing image information 100 inserts the coordinates of the intersection into the converted frame (S303).

The system for providing image information 100 uses the coordinates of the intersection included in the frame, the current travelling direction of the vehicle received from the outside, and the current position coordinates of the vehicle to determine whether the vehicle enters or is out of the intersection (S304).

When the vehicle is out of the intersection, the system for providing image information 100 discards the frame (S305).

When the vehicle enters the intersection, the system for providing image information 100 compares the corresponding road direction information of the image included in the frame with the travelling direction of the vehicle, thereby extracting the image information of the intersected road (S306).

The system for providing image information 100 broadcasts the extracted image information to the terminal 20 in the vehicle and provides it to the user (S307). Herein, the system for providing image information 100 displays which direction the corresponding road of the image runs in on the extracted image information as shown in FIG. 4 and provides it to the user through the terminal 20.

According to the exemplary embodiment of the present invention, the system for providing image information can provide the image information in each direction to the vehicle that enters the intersection and provide the image information to a driver through a terminal included in the vehicle. In other words, the system for providing image information provides the situation of the intersection as an image to the vehicle approaching the intersection before reaching the intersection, such that the driver in the vehicle can cope with the road situation.

In addition, according to the exemplary embodiment of the present invention, the system for providing image information compares the photographing direction of the road with the travelling direction of the vehicle to extract only the necessary image and provide it to the terminal, thereby making it possible to reduce the burden of the image processing of the terminal.

The above-mentioned exemplary embodiments of the present invention are not embodied only by an apparatus and method. Alternatively, the above-mentioned exemplary embodiments may be embodied by a program performing functions that correspond to the configuration of the exemplary embodiments of the present invention, or a recording medium on which the program is recorded. These embodiments can be easily devised from the description of the above-mentioned exemplary embodiments by those skilled in the art to which the present invention pertains.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for providing image information to a user in a vehicle by a system that is operated while interworking with a plurality of photographing apparatuses, the method being performed by processing circuitry configured to execute instructions stored in a tangible medium that when executed perform operations of the method comprising:

converting each of at least one image transmitted from the plurality of photographing apparatuses into a frame;

inserting coordinates of an intersection into the frame;

determining whether the vehicle enters the intersection based on the frame into which the coordinates of the intersection are inserted, the current travelling direction of the vehicle, and the current position coordinates of the vehicle;

when the vehicle enters the intersection, extracting image information of an intersected road from the frame corresponding to each of at least one image; and comparing the current travelling direction of the vehicle to road direction information to display the extracted image information to the user through a terminal in the vehicle such that the extracted image information presented includes an indication of a direction a corresponding road in the image runs.

2. The method for providing image information of claim 1, wherein the converting into the frame converts each of at least one image into a frame including direction information of the vehicles on the corresponding road of the image.

3. The method for providing image information of claim 2, wherein the extracting the image information extracts the image information on the road that intersects using the direction information of the vehicles included in the frame and the current travelling direction of the vehicle.

4. The method for providing image information of claim 1, wherein the determining whether the vehicle enters the intersection includes determining whether the current position coordinates of the vehicle are included in a predetermined radius based on the coordinates of the intersection, when the current position coordinates of the vehicle are included in the predetermined radius, determining whether the current travelling direction of the vehicle faces the coordinates of the intersection, and when the current travelling direction of the vehicle faces the coordinates of the intersection, determining that the vehicle enters the intersection.

5. The method for providing image information of claim 4, further comprising:

when the current travelling direction of the vehicle does not face the coordinates of the intersection, determining that the vehicle is out of the intersection; and discarding the frame including the coordinates of the intersection.

6. The method for providing image information of claim 4, further comprising:

when the current position coordinates of the vehicle are not included in the predetermined radius, determining that the vehicle is out of the intersection; and discarding the frame including the coordinates of the intersection.

7. A system for providing image information that is operated while interworking a plurality of photographing apparatuses that photograph a road situation, comprising:

an image processor that converts at least one image transmitted from the plurality of photographing apparatuses into a frame and inserts the coordinates of an intersection into the frame;

an enter determination unit that determines whether the vehicle enters the intersection based on the frame including the coordinates of the intersection, the current travelling direction of the vehicle, and the current position coordinates of the vehicle; and an extractor that extracts image information of an intersected road from the frame corresponding to each of the at least one image, when the vehicle enters the intersection based on comparing the current travelling direction of the vehicle to road direction information to display the extracted image information to the user through a terminal in the vehicle such that the extracted image information presented includes an indication of a direction a corresponding road in the image runs.

8. The system for providing image information of claim 7, wherein the image processor converts each of at least one image into a frame including direction information of the vehicles on the corresponding road of the image.

9. The system for providing image information of claim 8, wherein the extractor extracts the image information on the road that intersects using the direction information of the vehicles included in the frame and the current travelling direction of the vehicle.

10. The system for providing image information of claim 7, wherein the enter determination unit determines that the vehicle enters the intersection when the current position coordinates of the vehicle are included in the predetermined radius and the current travelling direction of the vehicle faces the coordinates of the intersection.

11. The system for providing image information of claim 7, wherein the enter determination unit determines that the vehicle is out of the intersection when the current travelling direction of the vehicle does not face the coordinates of the intersection.

12. The system for providing image information of claim 7, wherein the enter determination unit determines that the vehicle is out of the intersection when the current position coordinates of the vehicle are not included in the predetermined radius.

* * * * *